Feb. 12, 1946.        H. F. LENZ        2,394,619
INDICATING PARALLEL RULES
Filed Feb. 11, 1944        2 Sheets-Sheet 2

HUGH F. LENZ,
INVENTOR.

BY
ATTORNEY.

Patented Feb. 12, 1946

2,394,619

UNITED STATES PATENT OFFICE 2,394,619

INDICATING PARALLEL RULES

Hugh F. Lenz, Los Angeles, Calif.

Application February 11, 1944, Serial No. 521,943

6 Claims. (Cl. 33—108)

This invention pertains to indicating parallel rules particularly adapted for use by draftsmen, engineers, navigators, plotters and others engaged in sketching, map making, drafting, map interpretation, range finding, navigation and similar occupations.

Parallel rules consisting of two rules linked together so as to permit one of the rules to assume positions at varying distances from the other while maintaining parallelism with the stationary rule, are well known in the art. The present invention is directed to parallel rules provided with means whereby the distance through which the movable rule is moved in a direction perpendicular to its edge is directly and visibly indicated. If, therefore, it is desired to measure the distance between two points or two parallel lines, it is only necessary to move one of the parallel rules from the first to the second point or line, the distance between such points being immediately and automatically indicated upon the device. Means have also been provided whereby the distance between any two points in a direction parallel to the edge of the rule may also be visibly indicated. By the use of suitable scales and dials, the instrument may be applied to maps or charts so that instead of measuring in inches, the distance between points or lines may be read directly in terms of feet, yards, miles, or the like.

Generally stated, the present invention pertains to parallel rules including means whereby the distance through which one of the rules is moved with respect to the other, is automatically indicated upon a dial. It is to be noted that since rules are ordinarily linked together, one of the rules moving along an arc described by the end of the connecting link so that a straight line relationship between longitudinal and transverse movement does not exist, the means of the present invention permit direct reading on a uniformly graduated dial, thereby obviating the disadvantages which are inherent in a logarithmic or progressive scale.

In the device of the present invention, one rule is provided with a longitudinally extending guide while the other rule is provided with a rotatable element. The rotatable element is suitably geared to a transversely extending, transversely movable member which is in engagement with the longitudinally extending guide carried by the other rule. The combined longitudinal and transverse motion of the movable rule is converted by the elements referred to into a uniform movement of the dial or of an index member cooperating with a dial, so as to visibly indicate the amount of relative movement between the rules.

The means for measuring longitudinal displacement include an element movable along the edge of a rule and adapted to cooperate with a fixed scale carried by the rule.

It is to be noted, moreover, that the device of the present invention may be used independently or it may be provided with means whereby the device may be cooperatively engaged with or carried by the so-called universal drafting machine.

An object of the present invention, therefore, is to disclose and provide parallel rules provided with means for indicating distance through which said rules are moved relatively to each other.

A further object of the invention is to disclose and provide parallel rules whereby distances in directions parallel and perpendicular to the length of the rules may be measured directly.

A further object of the invention is to disclose and provide a simple, inexpensive and direct reading means for indicating relative movement between the two rules of a parallel rule linkage.

These and other objects, advantages and modifications of the invention will become apparent to those skilled in the art from the following detailed description of one form of device in which the invention is embodied.

Figure 1:
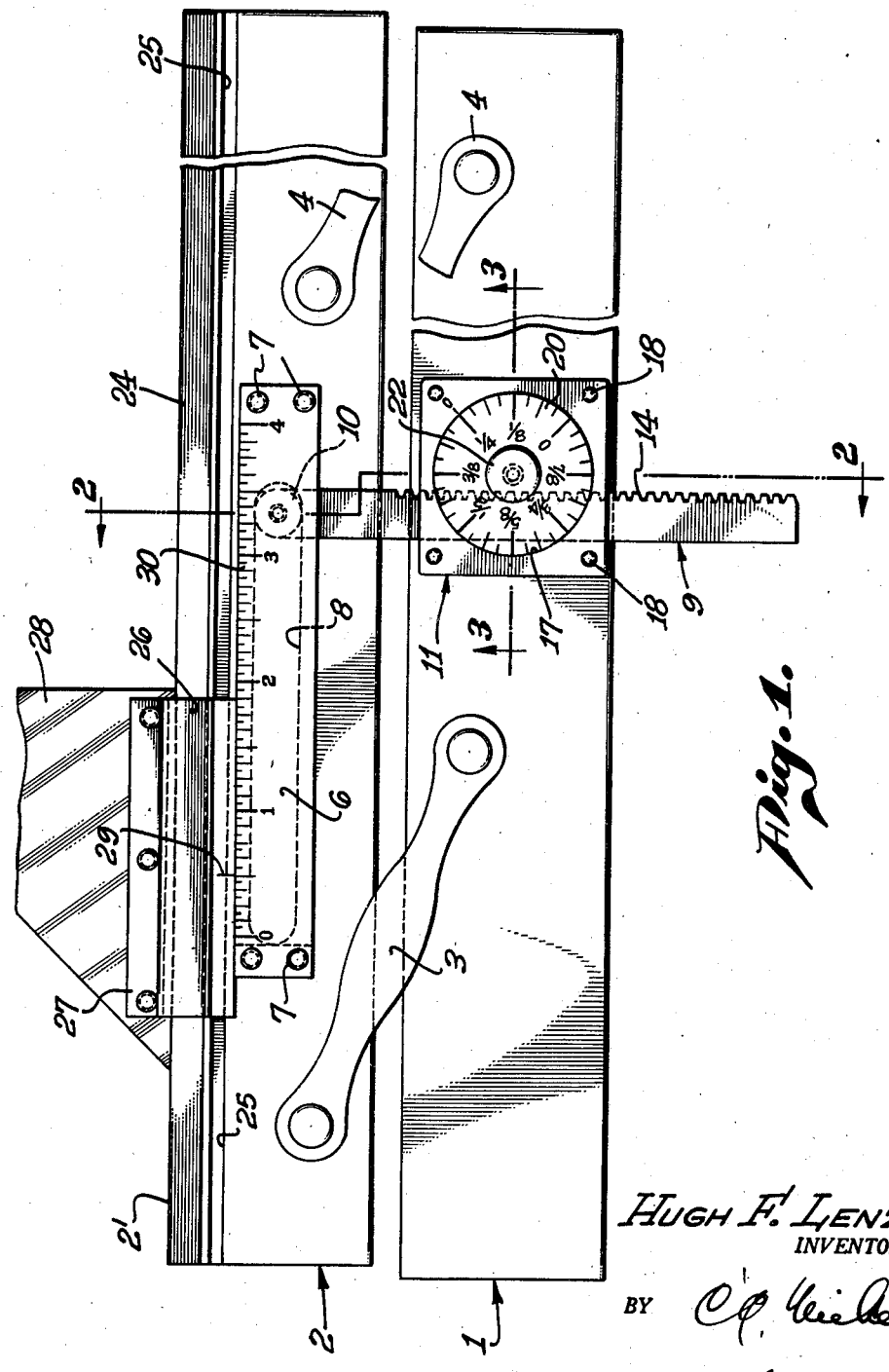
Fig. 1 is a plan view of parallel rules of the indicating type embraced by this invention.

As shown in the drawings, the device may include the two rules 1 and 2 which may be identified as lower and upper rules. Ordinarily, the lower rule 1 is stationary whereas the upper rule 2 is moved with respect to the rule 1. The two rules are connected by suitable arms, such as the links 3 and 4. The upper rule 2 may thus be moved with respect to rule 1, the upper edge 2' of the upper rule maintaining parallelism but changing its position or distance with respect to the lower rule as the upper rule is pivoted. Obviously, the upper rule 2 not only moves in a transverse direction but also moves in a longitudinal direction, the relationships between these two movements varying as a function of the angle of the links 3 and 4.

In accordance with the present invention, the upper rule 2 may be provided with a longitudinally extending guide member 6 adapted to be attached to the upper surface of rule 2 as by means of machine screws or rivets 7. The lower surface of guide member 6 may be provided with a guiding slot or recess 8 and the edge of the guide member facing the lower rule 1 may be cut away somewhat so as to permit a rack 9 carrying a pivoted roller 10 to slidably fit between the surface of rule 2 and the lower surface of the guide member 6 in the region of the slot 8, while the roller 10 extends into the guiding recess or slot. Preferably, the guiding roller 10 fits the groove or slot 8 so as to be movable in said slot without binding and without undue play. The outer or upper surface of the guide member 6 may be provided with a scale, as shown.

Figure 4:
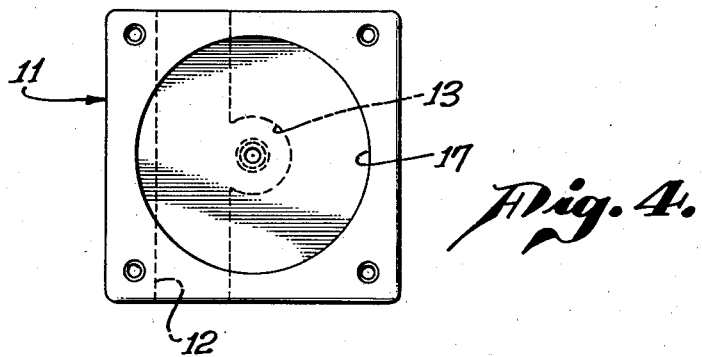
Fig. 4 is a plan view of the gear case.

The lower rule 1 is shown provided with a gear case 11, the lower surface of such gear case including a transversely extending slot, indicated at 12 in Fig. 4, and a circular or other suitable recess 13. The slot 12 should slidably receive the rack 9 whereas the recess 13 is adapted to receive a gear. The edge of the rack 9 is provided with gear teeth 14; a gear 15 mounted upon a staff 16 is journaled in an axial bore formed in the gear case.

Preferably, the gear is a one-tenth circular pitch gear (has a pitch circle of exactly one inch) so that the staff 16 makes one revolution for a one inch movement of the rack 9.

The upper surface of the gear case 11 is provided with a circular depression 17, this depression being separated from the lower slots 12 and 13 by a partition in which the staff 16 is journaled. The entire gear case may be attached to the upper surface of rule 1 as by machine screws or rivets 18.

Mounted upon the staff 16 is a calibrated disc 20, such disc being preferably separated from the partition in the gear case by means of a small washer 21. The end of the staff 16 may be provided with a knurled knob nut 22 which grasps the calibrated disc 20 against the washer 21. The disc 20 may be calibrated in any desired manner, that is, its circumference may be uniformly calibrated to represent one inch either in fractions or decimals. A zero index is preferably carried on the surface of the gear case so as to permit ready readings. It is to be understood that in the event the gear ratio between the rack and pinion is changed from that specifically referred to hereinabove, the calibration of the dial will also have to be changed or the gear change be taken into consideration in reading the dial.

Preferably, when the two rules 1 and 2 are in longitudinal contact, the zero position on the dial should be in alignment with the index carried by the gear case. As the upper rule 2 is pivotally moved away from rule 1, the dial 20 will visibly indicate the perpendicular distance separating the parallel line representing the original position of the upper edge 2'' and the instant position of such upper edge. As a result, parallel lines at any given or desired distance apart may be readily drawn or measured.

When the device is employed in reading maps drawn to a predetermined scale, as for example, 1 inch=3 miles, the disc 20 may have its circumference calibrated directly in miles, the entire circumference representing three miles and fractions of such circumference representing fractions or parts of the three mile unit. Since the circumference of a two inch dial is 6.28 inches, accuracy to within about fifty yards may be easily attained.

Moreover, the circumference of the dial 20 may be subdivided into tenths, hundredths and even thousandths of one inch or one centimeter, such dial then permitting the device to be used on any drawing, map or projection by the use of a conversion table.

As previously stated, the entire device may become a part of and may be used in conjunction with a universal drafting machine. If desired, the lower surface of rule 1 may be provided with a groove or slot capable of engaging the horizontal arm of a drafting machine so as to be movable therewith.

Figure 2:
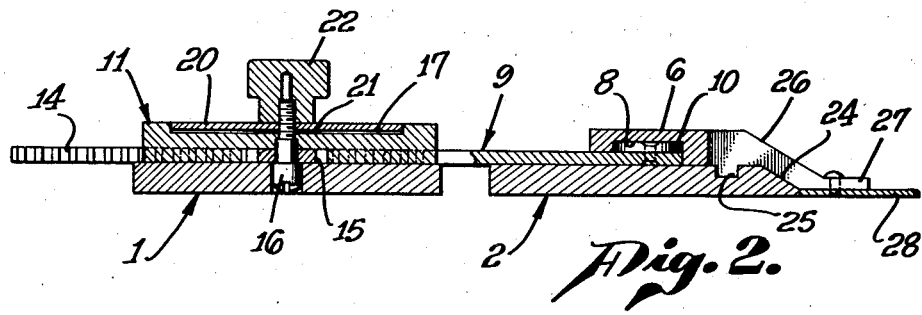
Fig. 2 is an enlarged transverse section taken approximately along the plane 2—2 of Fig. 1.
Figure 3:
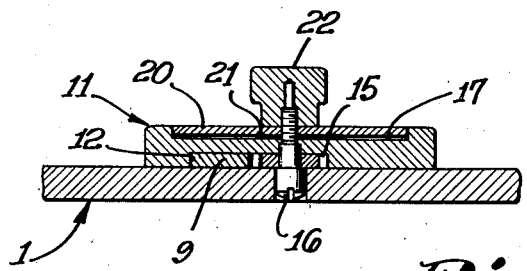
Fig. 3 is an end view of the gear case and rack along the zone 3—3 indicated in Fig. 1.

As shown in Fig. 2, the upper edge portion of rule 2 is tapered as at 24 and is provided with a longitudinally extending slot 25. A movable element 26 provided with a tongue adapted to extend into slot 25, and an arm or extension 27 attached to a triangle or other shape 28 having an edge perpendicular to the edge 2' of the rule 2, may be removably attached to the upper rule 2. This assembly may be moved along the upper edge of rule 2.

The element 26 may be provided with an index 29 adapted to cooperate with a scale 30 carried by the upper surface of guide member 6. By the use of these elements, the distance in a direction parallel to the rule 2 may be measured, a direct reading being obtained by simply shifting the element 26 from one position to the other and noting the reading on the scale 30.

It may be noted that a dial such as 20 may be permanently attached to or even inscribed in the top of the gear case and a movable pointer or index member carried by the staff 16. The movable element 26 may carry, in addition to the index 29, a Vernier scale so as to permit more accurate positioning of the straight edge 28. The roller 10 rotatably carried by the upper end of rack member 9 may rollably engage a groove formed in the top surface of rule 2. Another adaptation may comprise forming the lower surface of rule 1 with means whereby said rule becomes a part of a drafting machine.

The adaptability, utility and versatility of the device will be apparent from the description given hereinabove. It is to be understood that the various elements or parts of the device may be made from plastics or plastic compositions, light weight metals or alloys, resinous compounds, ivory, wood and many other materials. Various changes and modifications may be made without departing from the teachings of this invention. All changes coming within the scope of the appended claims are embraced thereby.

I claim:

1. Indicating parallel rules comprising: a pair of longitudinally parallel rules, link means connecting the rules, a rule being pivotally connected to each end of the link means, a rotatable indicating means carried by one of said rules, a driving means for the indicating means, and means carried by the other rule and cooperating with the driving means for translating motion of the rules relative to each other into motion of the indicating means.

2. Indicating parallel rules comprising: a pair of longitudinally parallel rules, a pair of link means connecting the rules, both ends of each link being pivotally connected to the rules, a uniformly calibrated dial rotatably mounted on the lower rule, a driving means for the dial, and means carried by the upper rule and operatively connected to the driving means for translating the motion of the upper rule in conjoint longitudinal and transverse directions relative to the lower rule into a uniform rotation of the dial.

3. Indicating parallel rules comprising: a pair of longitudinally parallel rules, link means connecting the rules, a uniformly calibrated dial rotatably mounted on the lower rule, a driving means for the dial, means carried by the upper rule and operatively connected to the driving means for translating the motion of the upper rule in conjoint longitudinal and transverse directions relative to the lower rule into a uniform rotation of the dial, a longitudinally extending guide means near the edge of the upper rule, and a longitudinally extending scale carried by the rule adjacent said guide means.

4. Indicating parallel rules comprising: a pair of longitudinally parallel rules, a pair of link means connecting the rules, a rule being pivotally connected to each end of each link, an indicating means carried by one of said rules, a driving means for the indicating means, said driving means including a transversely extending movably mounted rack, longitudinally extending guide means carried by the upper rule, and a roller pivotally mounted on one end of the rack and in rolling engagement with the guide means.

5. Indicating parallel rules comprising: a pair of longitudinally parallel rules, a pair of link means connecting the rules, the end of each link being pivotally connected to a rule, a gear case carried by one of said rules, a staff journaled therein, said staff carrying a pinion and an indicating means, a rack gear member operably engaging said pinion, a longitudinally extending guide means carried by the other rule, and a roller pivotally mounted on one end of the rack and in rolling engagement with the guide means whereby the combined longitudinal and transverse movement of one of the rules with respect to the other is translated into uniform rotation of the staff and indicating means.

6. Indicating parallel rules comprising: a pair of longitudinally parallel rules, a pair of link means connecting the rules, both ends of each link being pivotally connected to the rules a gear case carried by one of said rules, a staff journaled therein, said staff carrying a pinion and an indicating means, a longitudinally extending guide member carried by the other rule, and a rack gear member connecting said guide and the pinion and adapted to be moved by said guide whereby the movement of one of the rules with respect to the other in conjoint longitudinal and transverse directions is translated into uniform rotation of the staff and indicating means.

HUGH F. LENZ.